Feb. 23, 1926.  
C. S. THOMPSON ET AL  
1,573,880  
FILLED BAG CLOSING MACHINE  
Filed Oct. 28, 1922   8 Sheets-Sheet 1
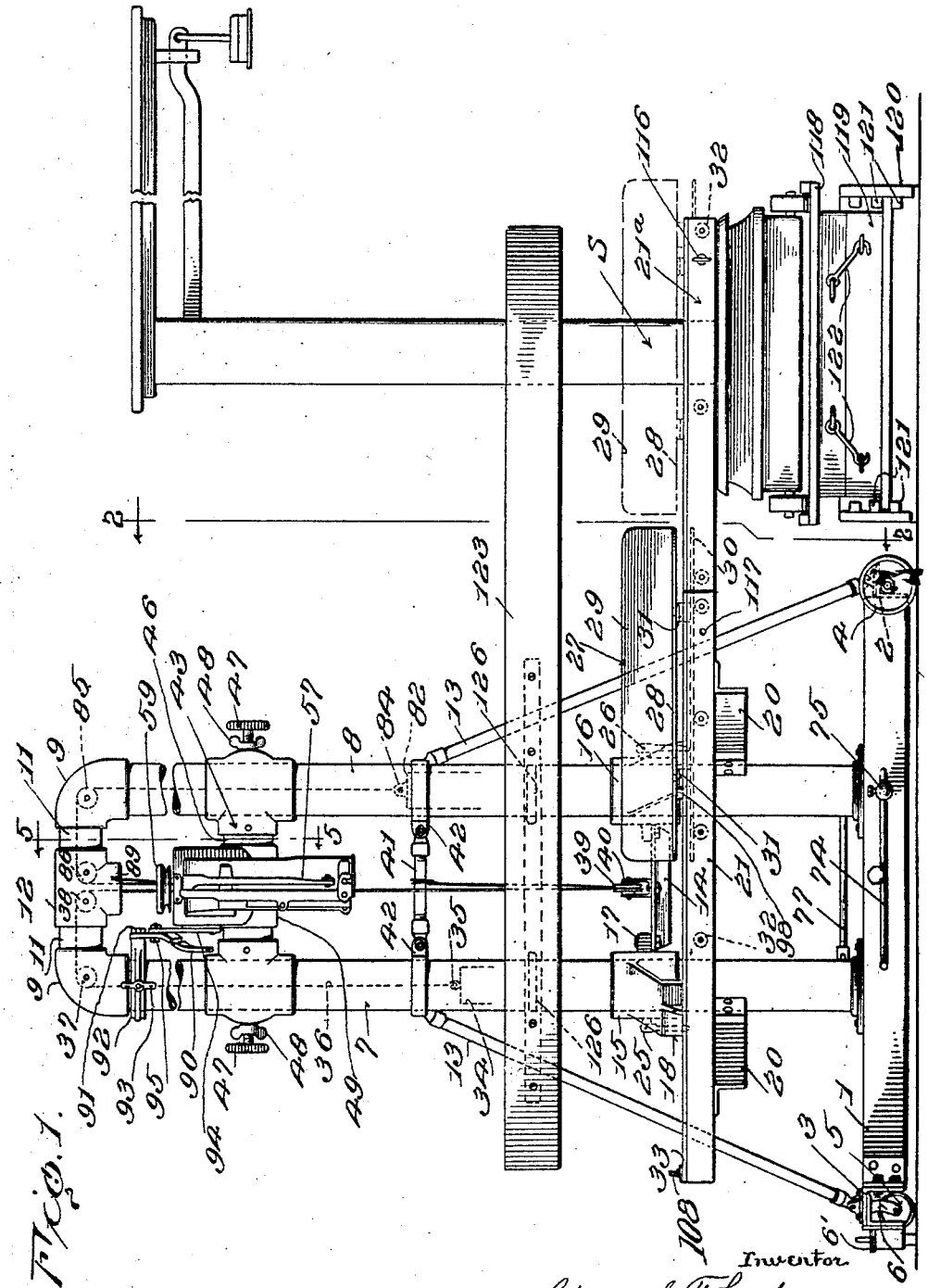
Inventor  
Charles S. Thompson  
By William B. Long  
Sturtevant Mason Attorneys.

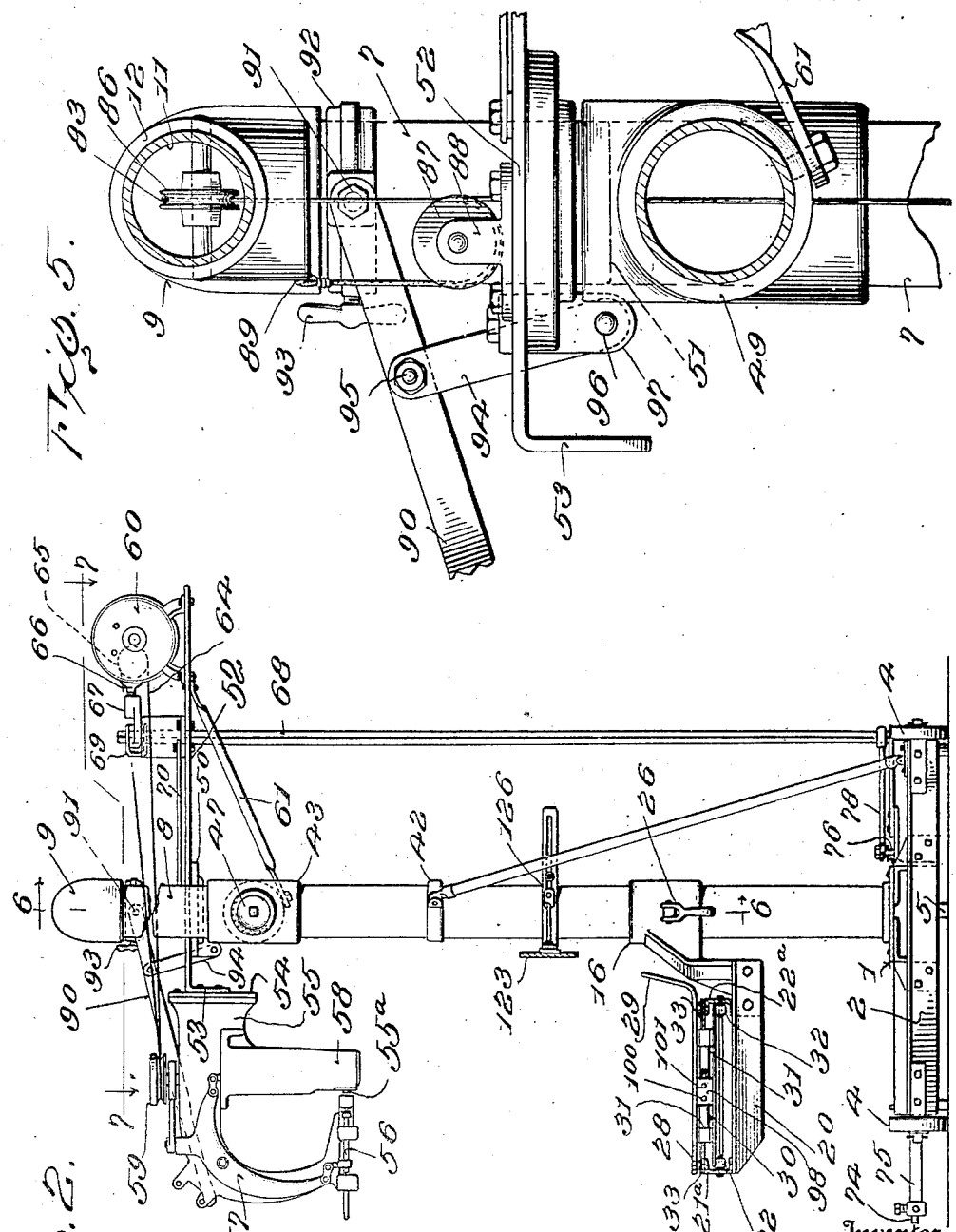

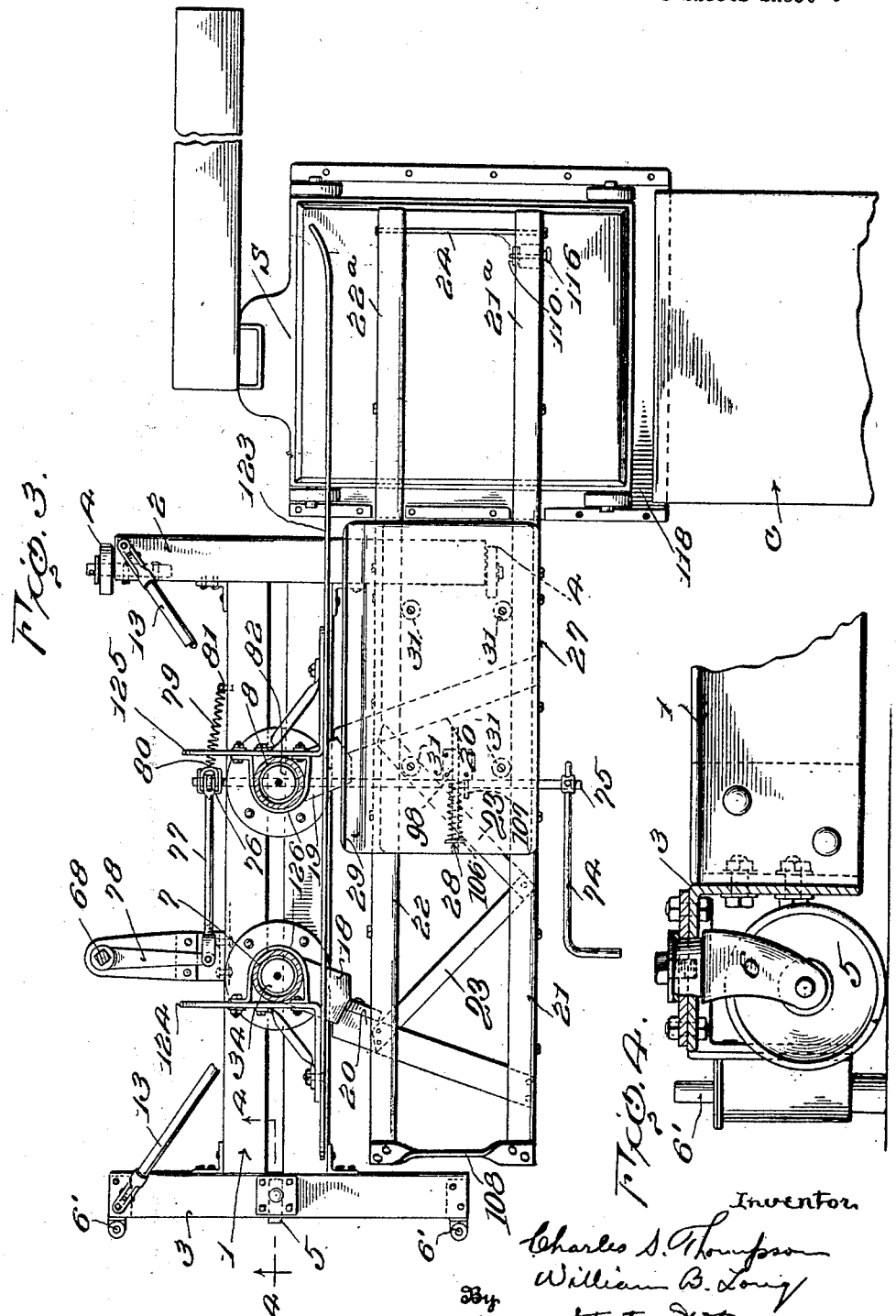

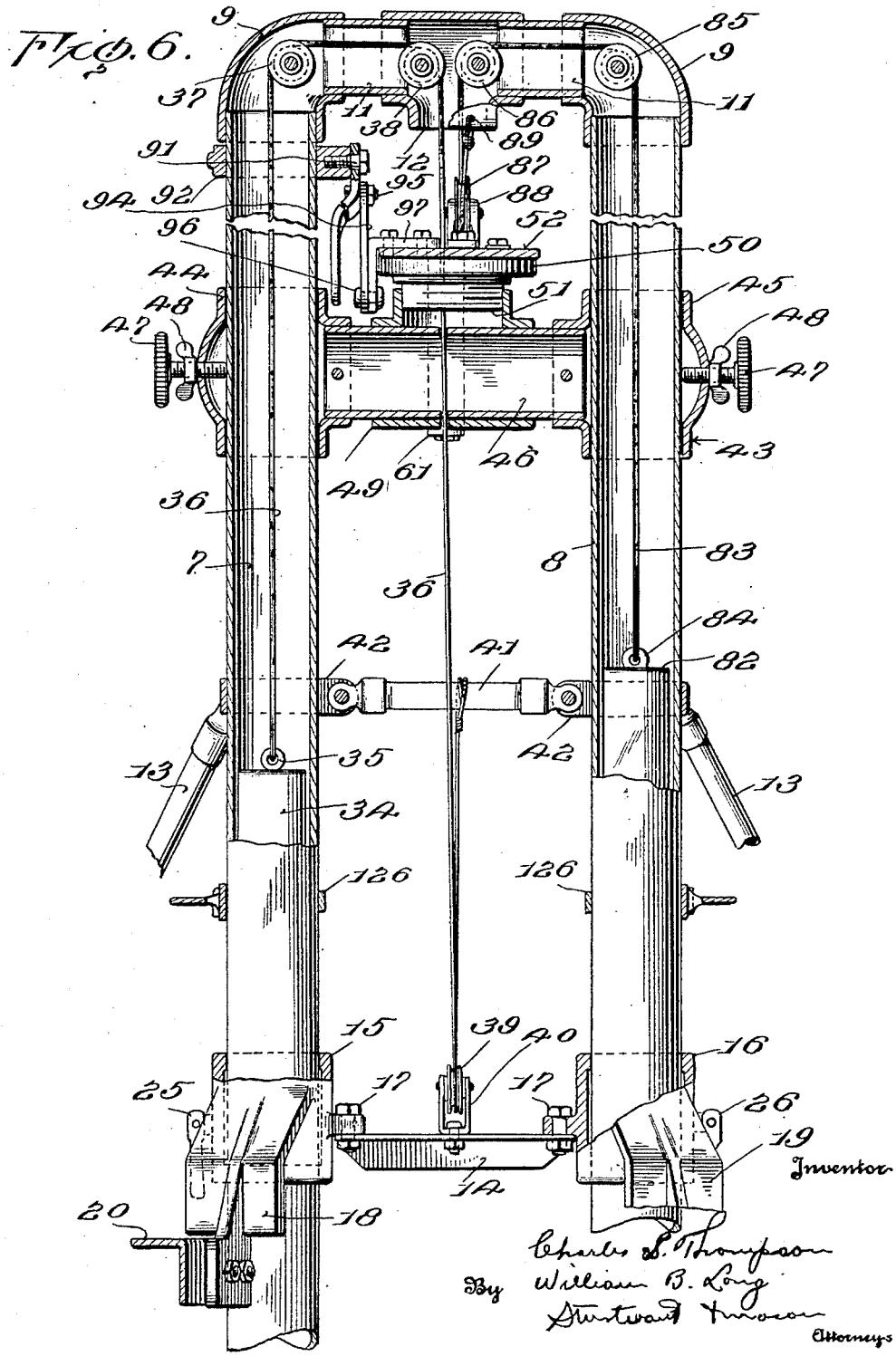

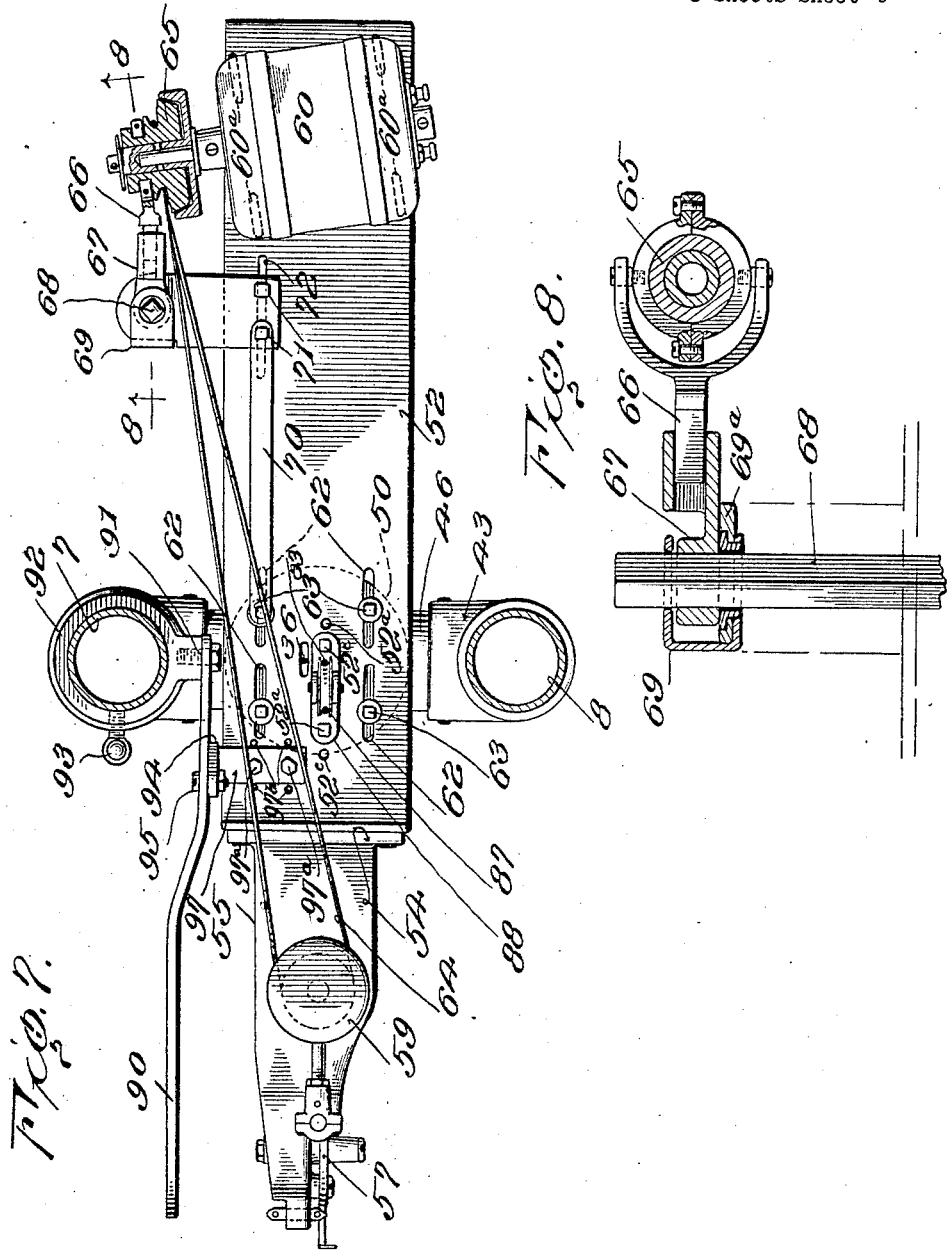

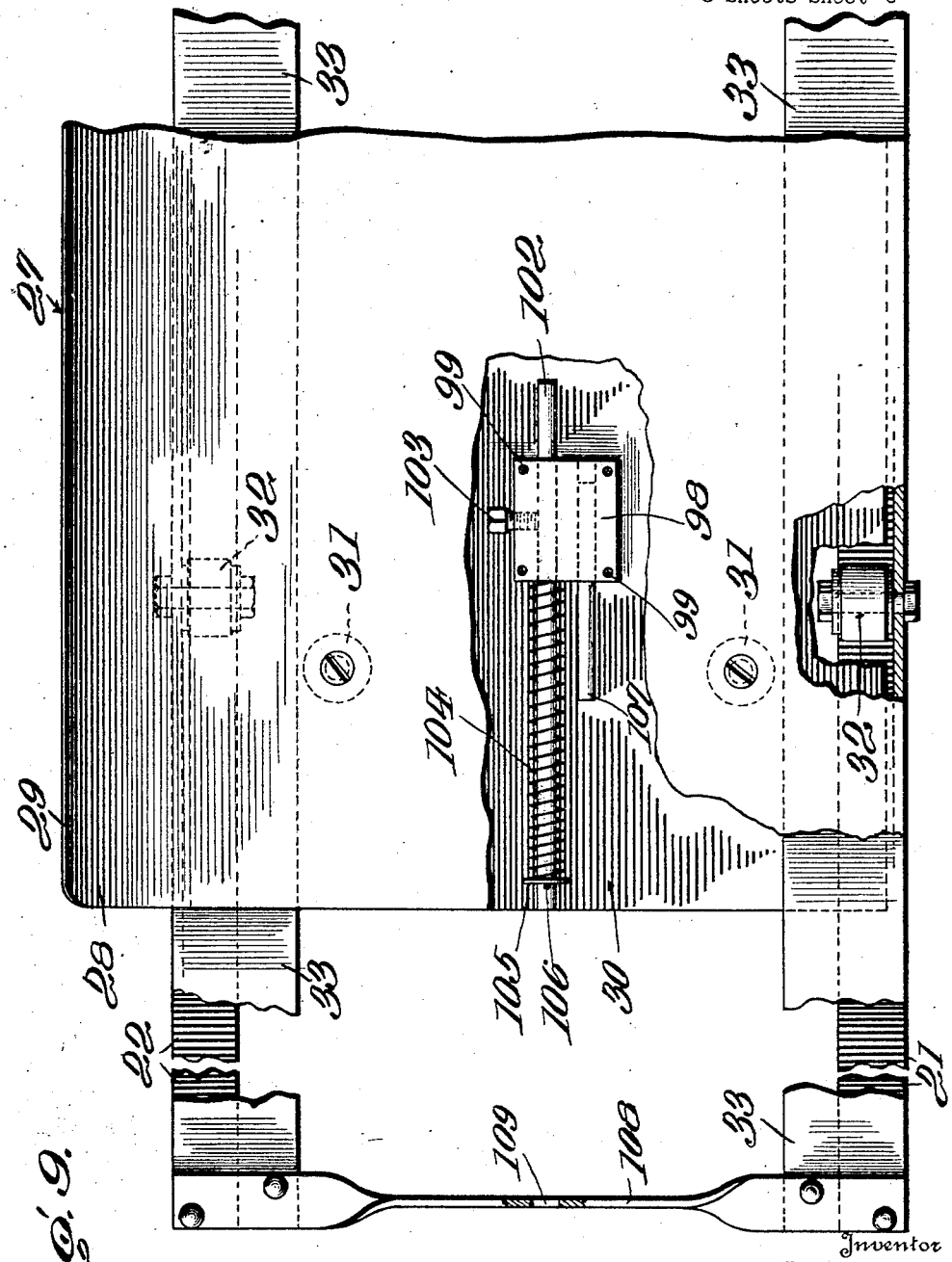

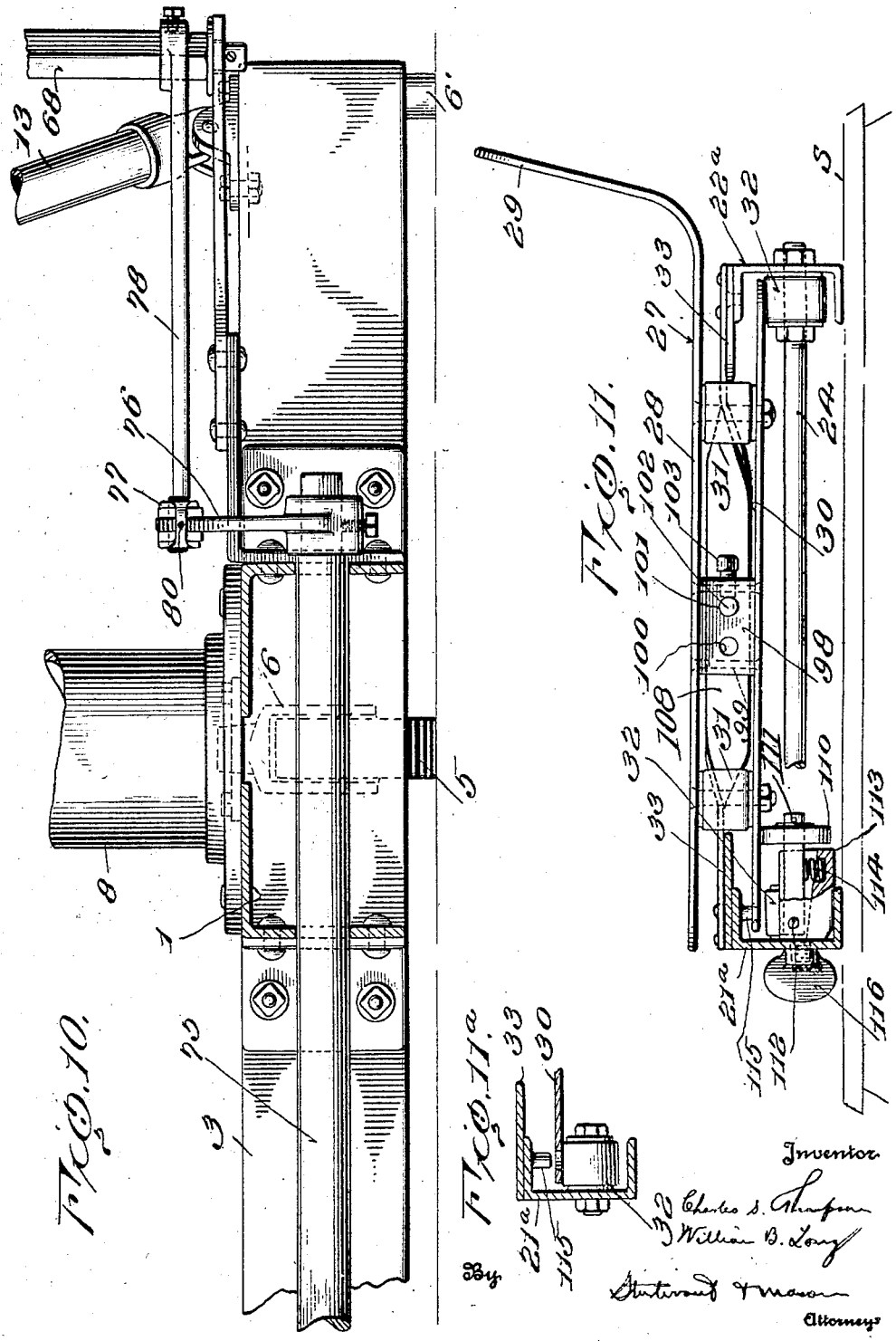

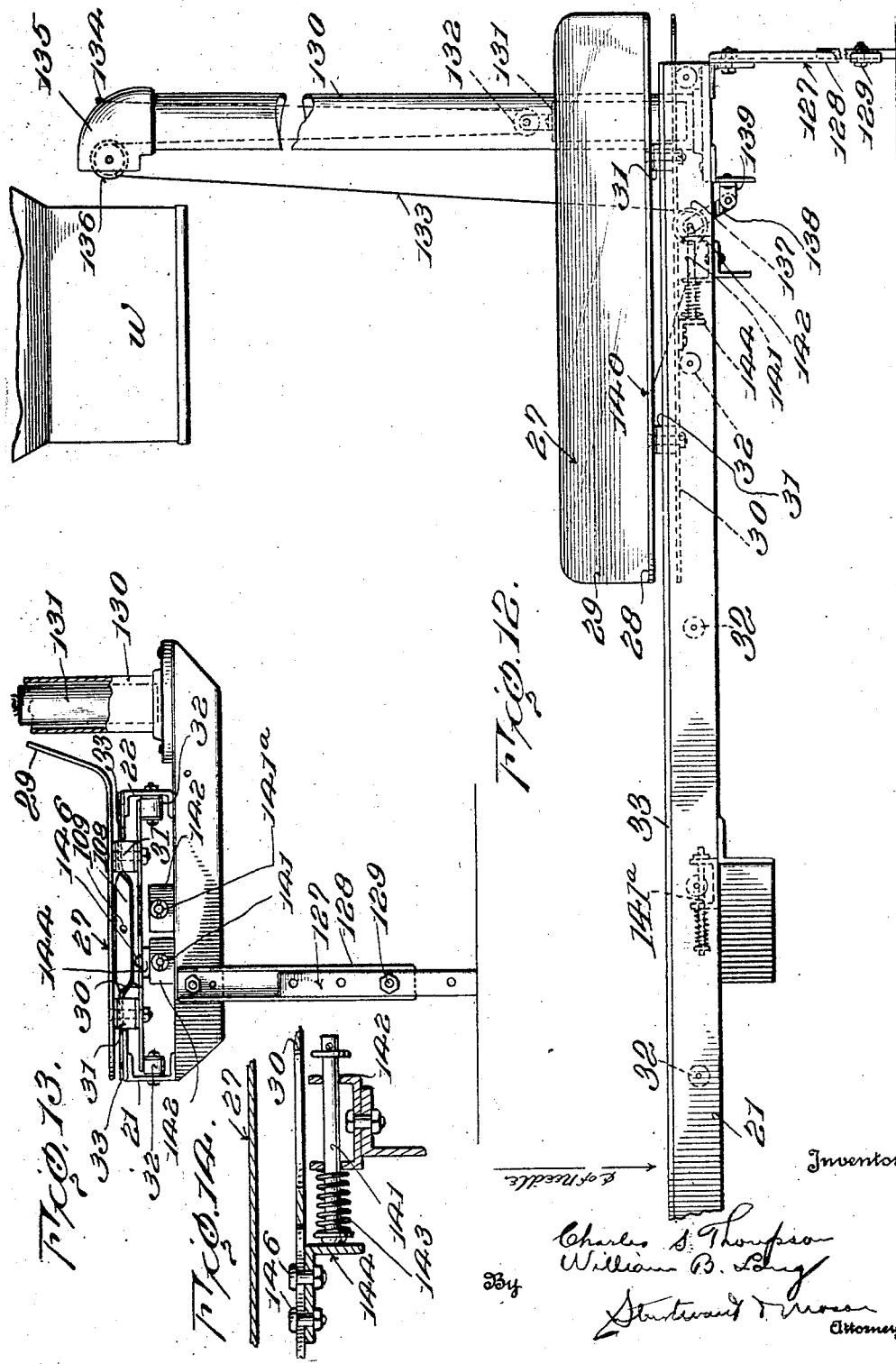

Patented Feb. 23, 1926.

1,573,880

UNITED STATES PATENT OFFICE.

CHARLES S. THOMPSON, OF PARK RIDGE, AND WILLIAM B. LONG, OF CHICAGO, ILLINOIS, ASSIGNORS TO UNION SPECIAL MACHINE COMPANY, OF CHICAGO, ILLINOIS, A CORPORATION OF ILLINOIS.

FILLED-BAG-CLOSING MACHINE.

Application filed October 28, 1922. Serial No. 597,615.

*To all whom it may concern:*

Be it known that we, CHARLES S. THOMPSON and WILLIAM B. LONG, citizens of the United States, residing, respectively, at Park Ridge and Chicago, in the county of Cook, State of Illinois, have invented certain new and useful Improvements in Filled-Bag-Closing Machines, of which the following is a description, reference being had to the accompanying drawing and to the figures of reference marked thereon.

The invention relates to new and useful improvements in filled bag closing machines, and more particularly to a filled bag closing machine having a conveyor on which the filled bag rests, which conveyor moves the bag past a stitching mechanism during the closing of the bag.

An object of the invention is to provide a filled bag closing machine which may be cheaply made and which shall be durable in construction, capable of rapidly closing the bag by stitching, and which is also capable of adjustment for stitching bags of different heights.

A further object of the invention is to provide a filled bag closing machine of the above type wherein both the sewing head and the conveyor are capable of being adjusted vertically and wherein counterbalancing means is provided for the head and for the conveyor.

A further object of the invention is to provide a filled bag closing machine of the above type wherein the counterbalancing means is housed in a tubular framework forming part of the filled bag conveying machine, and wherein said counterbalancing means is so arranged that a relatively light weight travelling through a greater distance than the part counterbalanced may be utilized.

A further object of the invention is to provide a filled bag closing machine wherein the supporting frame is formed by standard pipes and connections and wherein said frame includes spaced vertical standards on which are mounted upper and lower cross heads adapted to slide vertically on the standards, one of which supports the sewing head and the other the conveyor.

A still further object of the invention is to provide a supporting base for the filled bag closing machine of the above type, which base is so constructed as to provide an open space directly beneath the supporting bracket for the tracks on which the conveyor runs, so that the lower cross head may be lowered to a point where the tracks substantially rest upon the floor and thus gives a greater range of adjustment without unduly increasing the height of the machine.

A still further object of the invention is to provide a filled bag closing machine of the above type wherein the conveyor is in the form of a carriage movable on rollers carried by supporting tracks, and wherein means is provided which operates to return the carriage to normal loading position after the filled bag has been stitched and removed from the carriage.

A still further object of the invention is to provide an adjustable retaining device for temporarily holding the carriage in normal loading position.

Another object is to provide a filled bag closing machine which may be used in connection with weighing scales, and wherein tracks in alinement with the tracks of the filled bag closing machine may be carried by the scales and the carriage for the filled bag moved from the loading position on the scales to a stitching position on the filled bag closing machine.

These and other objects will in part be obvious and will in part be hereinafter more fully disclosed.

In the drawings:—

Figure 1 is a front view of a filled bag closing machine embodying our improvements;

Fig. 2 is a view on the line 2—2 of Fig. 1;

Fig. 3 is a view partly in plan and partly in section above the conveyor of the machine;

Fig. 4 is a sectional view on the line 4—4 of Fig. 3;

Fig. 5 is a sectional view on an enlarged scale on the line 5—5 of Fig. 1;

Fig. 6 is a sectional view on an enlarged scale on the line 6—6 of Fig. 2;

Fig. 7 is a sectional view on an enlarged scale on the line 7—7 of Fig. 2;

Fig. 8 is a sectional view on an enlarged scale on the line 8—8 of Fig. 7;

Fig. 9 is an enlarged plan view of a portion of the machine with parts broken away to show the means which operate to return the carriage, and the adjustable means which retain the carriage in loading position;

Fig. 10 is an enlarged sectional view along the line of the treadle operating shaft and showing part of the motor controlling means;

Fig. 11 is a view partly in section and partly in end elevation showing the carriage and the supporting means therefor;

Fig. 11ª is a sectional detail showing the carriage released from the stop;

Fig. 12 is a detail showing a modified form of the invention;

Fig. 13 is an end view of the structure shown in Fig. 12, and

Fig. 14 is a detail showing the yielding stop for the carriage when returned by the weight.

In our prior application Serial No. 561,523, filed May 16, 1922, we have shown and described a filled bag closing machine having a central supporting column which carries an adjustable bracket on which the sewing head is mounted and which also carries an adjustable bracket on which tracks are mounted for supporting the carriage, and this carriage is moved by the feed of the sewing machine during the stitching of the filled bag. Means is provided for adjusting the sewing head relative to the carriage, and the motor for operating the sewing head moves up and down with the sewing head. This motor is controlled by treadle means which is so constructed that the motor and sewing head may be shifted without disturbing the treadle controlling means. The present invention is an improvement upon the machine of our prior application. One of the purposes of the present invention is to provide a filled bag closing machine which can be made at relatively low cost, and to this end, the machine, except for the sewing mechanism, which is of the ordinary construction, is in a large part made up of angle irons and standard pipe sections and fittings. We prefer to use two vertical pipes which form the supporting columns for the supporting head and tracks for the carriage. These two vertical pipes are mounted on the supporting base which is H-shaped, and this provides a space directly beneath the tracks for the carriage which permits the tracks to be lowered to a point in contact with the floor so that a wide range of adjustment may be had without unduly increasing the height of the machine. Mounted on the two vertically arranged supporting pipes is a lower cross head having bracket arms on which the tracks are mounted which support a carriage. Also mounted on these vertical supporting pipes is an upper cross head, and this upper cross head carries a bracket which is horizontally adjustable, and mounted on the bracket is a sewing head which overhangs the carriage and the motor which operates the sewing head. The upper and lower cross heads are both shiftable on the supporting pipe and are held in different positions by clamping screws. In order to provide an easy adjustment of the carriage, we have provided a counterbalance which includes a flexible member and a weight. This weight is preferably arranged so as to run in one of the vertical pipes and is housed thereby. It is also preferably connected to the shiftable cross head supporting the carriage in such a way that the weight travels a greater distance than the carriage and thus a relatively small weight may be used for counterbalancing the carriage. The cross head is likewise counterbalanced by a relatively small weight running in the other vertical pipe.

The carriage for supporting the filled bag is preferably made of sheet metal and said carriage runs on rollers carried by the tracks so that the carriage runs very easily back and forth on the tracks. These rollers may be mounted on ball bearings and thus the friction incident to the travelling of the carriage reduced to a minimum. The tracks are horizontal, and the feed of the machine operating upon a filled bag resting on the carriage will move the carriage along the tracks as the bag is being stitched. When the bag is stitched and removed from the carriage, means is provided for returning the carriage to normal loading position and means is also provided for temporarily holding the carriage in loading position until the bag has been placed thereon. In one form of the invention, we have provided means for supporting scales which carry auxiliary tracks arranged in alinement with the tracks of the filled bag closing machine so that the carriage may run from the filled bag closing machine on to the scales for loading where the bag may be filled and weighed and then the carriage caused to travel on to the tracks of the closing machine for the closing of the filled bag. A bag rest is provided which is extended so as to support the filled bag while it is being weighed. Means is also provided for raising and lowering the scales so as to maintain the tracks carried by the scales in alinement with the tracks of the filled bag closing machine for different sized bags. In another form of the invention, the tracks are extended so that the carriage will run underneath an automatic weighing and filling machine so that the bag may be filled directly while resting on the carriage.

In order that the invention may be better understood, we have shown in the drawings in detail, one form of the invention which will now be described.

The supporting frame consists of a base provided with a central member 1 and cross members 2 and 3 arranged at the ends thereof, thus forming an H-shaped base. This base is preferably made of angle bars and brackets, as more clearly shown in Fig. 10 of the drawings. At the outer end of the cross member 2 are supporting wheels 4, 4. These supporting wheels are journaled on the cross member 2 so that they will turn freely thereon and said wheels serve as a supporting means for one end of the base. Substantially centrally of the cross member 3 is a supporting wheel 5 which is carried by a bracket 6 having a universal connection with the frame so that said wheel may readily turn to aid in the shifting of the filled bag machine from one position in the mill to another. When the machine has been properly placed, it is held in such position by means of vertically shiftable bolts 6', 6'. These bolts are preferably of the door-check type and they may be readily depressed by the foot of the operator so as to be brought into engagement with the floor, and said bolts are automatically held in depressed position by means which is capable of being released by the foot of the operator. Through these bolts, the cross member 3 may be supported at its outer ends, thus making a four point suspension for the machine, although the floor on which the machine rests may be uneven and also forming a supporting means which will keep the machine from creeping about during its operation.

Extending vertically from the supporting base are two spaced vertical column members 7 and 8. These column members are preferably formed of standard commercial wrought steel or iron pipes. They are rigidly secured to the supporting base, and as above noted, project vertically therefrom. Said pipe members carry at their upper ends pipe couplings 9, 9 which are in turn connected by short pipe sections 11, 11 and a central T-section 12. As above noted, these pipe sections and couplings are of the ordinary standard type and therefore the supporting frame of the machine can be made very cheaply and at the same time, a very durable and rigid structure produced. The vertical columns 7 and 8 are preferably braced by means of bracing pipe sections 13, 13.

Mounted on the vertical pipe sections is a lower cross head 14. Said cross head includes a sleeve 15 freely slidable on the pipe member 7 and a sleeve 16 freely slidable upon the member 8. These sleeves are connected by a cross member which is bolted thereto by means of bolts 17, 17. Extending forwardly from the sleeves 15 and 16, respectively, are bracket arms 18 and 19. These bracket arms 18 and 19 are each provided with an extension 20, and on these extensions are mounted the horizontal tracks 21 and 22. Said tracks are braced by cross braces 23, 23 and a connecting rod 24. The lower cross head 14 is readily shiftable vertically on the supporting columns 7 and 8 and may be held in adjusted positions by means of clamping screws 25 and 26, respectively. Mounted to move back and forth on the tracks 21 and 22 is a carriage 27. This carriage is adapted to receive the filled bag and forms a movable support therefor. Said carriage includes a supporting plate 28 with an upturned portion 29 which operates in properly positioning the bottom of the bag. Said carriage also includes a lower plate 30, and between the plates 28 and 30 are rollers 31 mounted on suitable spacing members. Disposed along the tracks 21 and 22 are rollers 32 preferably mounted on ball bearings, and the lower plate 30 is adapted to rest on these rollers. The rollers are so spaced that two or more are continually in engagement with the plate 30. The tracks 21 and 22 are formed of U-shaped angle bars to which are riveted inwardly extending members 33 (see Fig. 11). The rollers 31 engage the inner edges of these members 33, respectively. This takes up any side thrust on the carriage while the rollers 32 support the carriage. The rollers 31 are also preferably mounted on ball bearings and thus the carriage may be moved back and forth with very little friction to overcome. These tracks 21 and 22 extend at least from a position where the bag may be placed on the carriage before it is stitched, or loading position, to a position where the bag has passed completely through the machine and has been closed, after which it is removed from the carriage.

The lower cross head as above noted is capable of being raised and lowered vertically, and we have provided a counterbalance for the cross head, which counterbalances the weight of the tracks and supporting member therefor, and the carriage, and this makes the lower cross head very much more easily shiftable. This counterbalance consists of a weight 34. Said weight runs in the vertical column pipe 7 and is housed thereby. Connected to an ear 35 on said weight is a chain or other flexible connection 36. This flexible connection runs over a pulley 37 mounted in the coupling 9 at the upper end of the pipe 7, thence over a pulley 38 mounted in the T-coupling 12, and thence over a pulley 39 carried by a bracket 40 bolted centrally of the cross member connecting the sleeves 15 and 16 and forming the cross head 14. The flexible member 36 after passing over the pulley 39 extends upwardly and is connected to a cross bar 41. This member 41 at its outer ends is bolted to collars 42, 42 which are rigidly secured to the columns 7 and 8. The collars 42, 42 also serve as a means for connecting the brace rods 13. It will thus be seen that the flexible connection 36 doubles back on itself so that the weight 34 travels twice as far as the lower cross head 14. Inasmuch as the weight travels twice as far as the member which it counterbalances, it may be made one-half as heavy as would be necessary if the counterbalance travelled the same distance as the cross head. This enables a relatively small weight to be used for counterbalancing the lower cross head and the parts carried thereby, and in turn enables the counterbalancing weight to be of such size that it may be readily housed within one of the vertical columns without unduly increasing the size of the columns.

Also mounted on the vertical columns 7 and 8 is an upper cross head 43. Said upper cross head includes sleeves 44 and 45 mounted to slide freely on the columns 7 and 8, respectively. These sleeves are connected by a cross pipe 46. Suitable openings are provided in this cross pipe 46 for the flexible member 36. The upper cross head as above noted, slides freely on the columns 7 and 8 and can be held rigidly in adjusted position by set screws 47, 47 carried by said sleeves, and which are adapted to engage the column members. These set screws may be held in set position by lock nuts 48.

The sewing head and motor for operating the same are mounted on this upper cross-head. The cross pipe 46 is provided with a T-head 49 having a central T-portion extending upwardly. A supporting plate 50 is provided with a depending portion 51 which is adapted to engage this upwardly extending T-portion, so that the plate 50 is rigidly supported on the upper cross head. Mounted on this plate 50 is an adjustable member 52. Said member 52 extends forwardly of the columns 7 and 8 and is provided with a depending portion 53 to which is bolted a plate 54 that in turn carries the sewing head 55. Said sewing head is of the usual construction and includes a feeding mechanism having a feed dog 55ᵃ and a needle bar 56 reciprocated in the usual way by a needle lever 57, and cooperating with the needle in the work supporting cylinder 58 is a complemental stitch forming mechanism. The parts of the sewing mechanism are actuated by means of a belt wheel 59. The sewing head overhangs the carriage as is customary in the filled bag type of sewing machine, so that the mouth of the bag may be passed underneath the presser foot and be engaged by the feeding mechanism of the sewing machine. As the feeding mechanism of the sewing machine feeds the bag, it will cause the carriage on which the bag rests to travel, thus conveying the bag as it is stitched underneath the head and stitching a straight line of stitching across the mouth of the bag which is parallel with the bottom of the bag. The supporting member 52 extends rearwardly from the supporting columns 7 and 8 and on said supporting member is mounted the motor 60. The supporting member 52 is preferably braced by means of a brace rod 61, which is connected at one end to said supporting member and at its other end to the T-head 49 carried by the cross pipe 46. The supporting member 52 is provided with slots 62, 62 and bolts 63, 63 passing through said slots into the supporting plate 50 secure the member 52 rigidly to said supporting plate. These slots permit the member 52 to be adjusted endwise or in a direction substantially at right angles to the plane of travel of the carriage on the supporting tracks, and this endwise adjustment of the supporting member 52 will shift the sewing head so as to locate the same centrally over the carriage or at a point either slightly in rear or in front of said central location. This adjustment enables the sewing to be directly over the center plane of the bag if desired. The motor 60 is bolted to the plate 52 by bolts passing through slots 60ᵃ and may be adjusted on the plate 52 so as to tighten the belt 64 which runs over the pulley 59 of the sewing machine. This belt 64 also runs over a loose pulley 65 associated with the motor 60. Said loose pulley 65 may be connected up to the motor in any suitable way. We have shown as our preferred form, a friction clutching means, and this friction clutching means is controlled by means of an arm 66, which when moved one way or the other will either connect up or disconnect the motor from the loose pulley. Said arm 66 is controlled by a suitable treadle which is accessible to the operator. The arm 66 is directly connected to an arm 67. The arms 66 and 67 have a telescoping connection as clearly shown in Fig. 8 of the drawings. The arm 67 is loosely connected with a vertical shaft 68. This shaft 68 as shown in the drawings is rectangular in cross section and fits a rectangular opening in the arm 67, so that any oscillating movements imparted to the shaft 68 will swing the arm 67, and this will in turn move the arm 66 and cause the loose pulley to be connected to or disconnected from the motor.

The cross head carrying the sewing machine and the motor are vertically adjustable as above noted, and therefore the motor will move longitudinally of the shaft 68 which has no vertical adjustment. The arm 67 has a loose connection with the shaft 68, that is, it can slide freely endwise of the shaft, but any turning movement of the shaft will oscillate the arm. Mounted on the plate 52 is a yoke bracket 69. This yoke bracket 69 straddles the arm 67 and forms a support therefor. The yoke bracket, however, being mounted on the plate 52 moves up and down therewith when the sewing head is adjusted and shifts the arm 67 on the vertical shaft 68. This vertical shaft 68 is journaled in a suitable bearing on the supporting base, and as above noted, does not move vertically. A bushing 69$^a$ serves to center the shaft 68 in the opening in the bracket 69. Neither is it desirable that the upper end of said shaft should shift horizontally during the adjustment of the sewing head and motor. The positioning link 70 is connected with one of the bolts 63 and with one of the bolts 71 which pass down through the yoke bracket 69 through slots 72 in the supporting plate 52. This positioning link maintains the yoke 69 a definite distance from the columns 7 and 8 and thus maintains the upper end of the shaft 68 in a relative fixed position. The slots 72, however, permit the plate 52 to be moved endwise and the telescoping connection between the arms 66 and 67 enables the motor to be moved with the sewing head toward and from the columns 7 and 8.

The vertical shaft 68 is capable of being oscillated by a treadle bar 74. This treadle bar 74 is adjustably connected to a cross shaft 75 mounted in suitable bearings on the supporting base (see Fig. 10). Rigidly secured to the inner end of this cross shaft 75 is an arm 76. This arm 76 is connected at its upper end with a link 77 and the link 77 in turn connected to the upper end of an arm 78 which is rigidly connected to the shaft 68.

When the shaft 75 is oscillated it will in turn oscillate the arm 76 and then through the engagement with the arm 78 will oscillate the shaft 68. A spring 79 secured at 80 to the link 77 and at 81 to the frame 1 normally operates to raise the treadle bar 74 and turn the shaft 68 so as to release the motor from the sewing machine. When this treadle bar is depressed, then the shaft 68 is oscillated so as to connect up the motor with the sewing machine.

As above noted, the upper cross head carrying the sewing head and motor are shiftable up and down with the column members 7 and 8. We have provided a counter-balance for counter-balancing the weight of these parts and said counter-balance includes a weight 82 which runs freely up and down in the pipe 8. A flexible connection 83 is secured to an ear 84 carried by the weight, and this flexible connection which may be in the form of a chain or a cord runs over a pulley 85 carried by the coupling 9, thence over a pulley 86 carried by the T-member 12. Said flexible connection 83 then extends down through the central opening of the T-head 12 and to a pulley 87 carried by a bracket 88 which is bolted to the supporting plate 52, by bolts 52$^a$. The bracket may be adjusted by shifting the bolt 52$^a$ to other bolt holes 52$^c$. This is done when the plate 52 is shifted. The flexible connection then extends upwardly and is secured at 89 to the T-member 12. It will thus be noted that the flexible connection turns back on itself, so that the weight 82 will travel twice as far as the cross head carrying the sewing head and can be consequently made very light and readily adapted to be housed in one of the columns without making the column member unduly large.

We have provided means for shifting the head which consists of a hand lever 90. Said hand lever 90 is fulcrumed at 91 on a sleeve 92, which sleeve is capable of adjustment on the column member and is held in adjusted positions by a set screw 93. A link 94 freely secured to the lever at 95 is also pivotally connected at 96 to a bracket 97 rigidly attached to the plate 52, by bolts 97$^a$. This bracket 97 may be shifted by changing the bolts 97$^a$ to other bolt holes 97$^b$. This is necessary only when the plate 52 is shifted. It will readily be seen therefore, that after the set screws 47 have been released, the lever 90 may be raised or lowered and this through the link connection 96 will raise or lower the upper cross head. In order that the lever 90 may be normally positioned close to the sewing head, the sleeve on which said lever is fulcrumed is capable of adjustment as above noted, so that when the cross head is shifted a considerable distance, then the sleeve can be adjusted so as to bring the levers back to substantially horizontal position.

When the filled bag has been closed and is removed from the carriage, it is desirable to provide some means for returning the carriage to loading position. In one form of the invention we have provided a spring for accomplishing this result. On the under side of the plate 28 is a block 98. This block lies between the two plates 28 and 30, and screws 99 passing through the plates and block not only secure the block to the carriage, but also help to secure the two two plates 28 and 30 together. The block 98 is provided with two passages 100 and 101. A rod 102 is located in one of these passages and is secured therein by means of a set screw 103. Surrounding this rod is a spring 104 which bears at one end against the block 98 and at its other end against a washer 105 which is held from moving off from the end of the rod by means of a pin 106. Located in the other passage 100 is a rod 107. The ends of the tracks 21 and 22 are connected by a cross bar 108 which is bent between its ends to form an angle stop plate. This stop plate is so positioned as to pass between the plates 28 and 30 of the carriage 27.

Referring to Figs. 3 and 9, it will be apparent that when the carriage is moved to the left, the rod 102 will pass through the opening 109 and the washer 105 engaging against the angle stop plate will move along the rod 102 compressing the spring 104. This continues until the rod 107 strikes the angle stop plate, which stops further movement of the table. It is understood, of course, that this angle plate is so disposed that the bag is completely stitched before the rod 107 strikes the angle plate. The carriage is now in position for unloading and the bag is lifted off from the carriage or caused to fall off from the carriage by means such as shown in our prior application and as soon as the weight of the bag is taken from the carriage, the spring will at once force the carriage to the right causing it to return to loading position. It is also desirable to provide means for holding the carriage in loading position so as to avoid any possible chance of the carriage being moved along the track by the operator in placing the bag on the carriage. One way of accomplishing this consists in providing a roller 110. This roller 110 is carried by a short shaft 111 which is pivoted at 112 to a bracket 113. A spring 114 bearing against the short shaft normally raises the same so that the pin 115 will pass into the opening in the plate 30 and stop the movements of the carriage. It will readily be seen that when any weight is placed on the carriage, the spring 114 will be compressed, the roller 110 lowered, and the plate 30 lowered so as to be released from the pin. It will thus be seen that this yielding roller together with the pin and opening form an automatic means for stopping and holding the carriage when it is unloading and any load on the carriage will automatically release the same so that it can be moved forward. The bracket 113 is capable of being adjusted along the track 21 and may be secured in any adjusted position by means of a holding thumb screw 116. This thumb screw passes through the opening in the side member of the track and is threaded into the bracket. The opening 117 in Fig. 1 of the drawings is one of the openings through which the stop means is secured to the track.

In Figs. 1 and 3 of the drawings, we have shown our filled bag closing machine as adapted to be used in connection with weighing scales. In this form of the invention, auxiliary tracks 21ª and 22ª are provided which are fastened to the platform scales indicated in the drawings by S. The scales are mounted on a table 118 and this table is carried by a frame 119 which is capable of being adjusted in a supporting rack 120. The frame may be slid between spaced ribs 121 and thus placed in various positions so as to raise or lower the platform scales to accord with the height of the tracks on the filled bag closing machine. The table 118 is secured to the frame 119 by means of hooks 122. The auxiliary tracks 21ª and 22ª are arranged in alignment with the tracks 21 and 22, and as a result, the carriage will run along the tracks of the filled bag closing machine on to the tracks carried by the scales. Of course, the scales are balanced to take care of this extra weight of the tracks and carriage. The bag is filled to the desired extent determined by the weight, and then the carriage run along the auxiliary tracks on to the main tracks of the closing machine. A bag support 123 is provided. This bag support is carried by the brackets 124 and 125. These brackets 124 and 125 are secured to the respective columns 7 and 8 by means of straps 126 and suitable bolts. The bag support is bolted to these brackets and not only extends the full length of the closing machine, but also across the platform of the scales so as to properly guide the bag from its weighing position to the stitching position.

From the above it will be apparent that the filled bag closing machine may be adjusted for bags of different sizes and that scales can also be positioned to cooperate with the filled bag closing machine.

In Figures 12 and 13 we have shown a slightly modified form of the invention wherein the filled bag closing machine is adapted to be used in connection with the automatic weighing and filling machine. The delivery spout of the automatic weighing and filling machine is indicated at W. The tracks 21 and 22 are extended to one side of the closing machine so that the carriage may travel outwardly to a point underneath the filling spout W. In order to support the tracks, we have provided an adjustable leg or legs 127. This supporting leg is made in adjustable sections so as to accommodate different heights of the track and may also be made so as to fold up when desired. One of said sections is preferably formed of channel iron 128, while the other nests within the channel iron and is secured therein by means of a bolt 129. In Fig. 12 of the drawings, we have shown a modified form of means for returning the carriage to normal loading position beneath the spout W. In this form of the invention there is a tubular standard 130 carried by the tracks and a weight 131 freely moves up and down in said tubular standard. Said weight is provided with a pulley 132. A flexible cord or chain 133 runs over the pulley 132. One end of this cord or chain is secured at 134 to an elbow coupling 135 mounted on the upper end of the tubular standard. The flexible cord or chain also runs over a pulley 136 located in this elbow coupling. The cord or chain then runs over a pulley 137 carried by an arm 138 secured to a bracket 139, and from this pulley 137 the cord is extended to the carriage and is secured at 140 to the carriage.

It will readily be seen that as the carriage is moved to the left, it will lift the weight in the tubular standard and as soon as the carriage is relieved of its load, the weight will drop and return the carriage to the position shown in Fig. 12. In order to provide a spring buffer to stop the carriage when returned by the weight, we have as shown in Fig. 14, provided a spring buffer pin 141 mounted to slide in a U-bracket 142 carried by the cross frame joining the tracks, and said buffer pin is provided with a spring 143 which is located between the end of the U-bracket and a washer on the end of the buffer pin. An angle bracket 144 is adjustably secured to the under side of the table, and this angle bracket is adapted to engage the buffer pin to limit the movement of the table. This buffer pin is located so as to stop the carriage in position for filling the bag from the feed spout W. An angle bracket 144 is secured by bolts 146, 146 to the carriage and said bracket engages the buffer stop pin. The angle plate can be adjusted on the carriage. There is a second buffer pin 141ª at one side of the buffer pin 141 and similar in construction thereto, for stopping the carriage in position for loading bags which have been filled before being placed on the carriage. The bracket 144 is detached and shifted laterally so as to cooperate with the buffer pin 141ª when the carriage is to stop at these different loading stations.

As shown in Fig. 11, an automatic yielding stop is located on the auxiliary track 21ª so as to stop the carriage on the scales. As clearly shown in Fig. 3, an inclined plane is provided for running the scales into and out of place.

The operation of our device will be obvious from the above description. The bags are filled automatically while resting on the carriage which is at the time in loading position, or they are filled and then placed on the carriage on the scales for weighing while the carriage is in loading position, or the bag may be placed on the carriage while it is at one side of the stitching mechanism after which the carriage is moved forward until the bag mouth is brought within range of the stitching mechanism. The mouth of the bag is then directly beneath the presser foot of the sewing machine and will be engaged by the feed dog of the sewing machine, and the fabric as it is stitched fed through the machine. This feeding of the mouth of the bag through the machine will draw the carriage along, or the operator may aid the movement of the carriage by the slight pressure of the hand. After the bag has been completely stitched, then it is removed from the carriage and the carriage automatically returns to loading position where it is held in one case by an automatic stop and in the other case by the returning means itself. It will be obvious, of course, that other means may be provided for returning the carriage and for holding the same in loading position. The sewing head may be readily shifted vertically by raising and lowering the upper cross head so as to position the sewing head for stitching bags of different sizes and the cross head is readily shifted by reason of the fact that it is counterbalanced and a hand lever is provided for aiding in the shifting of the head. It is also sometimes desirable in going from larger to smaller bags of considerable range, to shift the position of the conveyor, that is, the carriage which presents the bags to the stitching mechanism. This also may be readily done by raising and lowering the supporting brackets for the tracks on which the carriage moves and these brackets are carried by the lower cross head which also counterbalances and thus permits the adjustment to be readily made. It will be noted that as the sewing head is raised or lowered, the motor for operating the same is also raised and lowered. The motor is controlled by the treadle, and the train of mechanism between the treadle and the motor is so constructed that the motor may be raised and lowered without in any way disturbing this treadle controlling mechanism.

While we have shown a shaft which is rectangular in cross section as forming the connection between the treadle and the clutch controlling arm, it will be understood that this shaft may be otherwise shaped or constructed. The essential feature consists in providing a connection with the arm which will cause the arm to oscillate with the shaft and yet permit the arm to move freely endwise on the shaft. While we have shown a friction clutching mechanism for bringing about a connection between the motor and the sewing machine, it will of course, be understood that various other forms of connecting means may be provided within the spirit of the invention. It will be noted that the base is H-shaped and that the brackets which support the tracks are disposed between the end members of the H-shaped base, and this permits the lower cross head to be moved downward to a position where the supporting arms for the tracks contact with the floor. This not only gives a wide range of adjustment for the carriage, but brings the carriage to a position close to the floor for large sacks and saves the operator the labor of lifting the heavy sacks higher than necessary from the floor.

It will also be noted that our improved machine is made to a large extent from commercial angle irons, pipe sections and couplings, so that said machine may be made at very low cost, and yet it is so well braced as to be very durable in construction. With the carriage mounted on rollers as described above, there is very little friction to the travel of the carriage, and a high speed sewing machine may be used so that the output of the machine may be made very high.

It is obvious that many changes in the details of construction and the arrangement of the parts may be made without departing from the spirit of the invention as set forth in the appended claims.

Having thus described the invention, what we claim as new and desire to secure by Letters-Patent, is—

1. A filled bag closing machine including in combination, a supporting frame, a sewing head mounted thereon having means for feeding the mouth of a filled bag, a carrier, supporting means carried by said frame and on which said carrier is adapted to be moved, said carrier being adapted to be moved along said supporting means by the feed of the sewing machine operating upon the filled bag mounted on the carrier, and means for automatically returning the carrier to normal position for loading after the filled bag has been removed therefrom.

2. A filled bag closing machine including in combination, a supporting frame, a sewing head mounted thereon having means for feeding the mouth of a filled bag, a carrier, supporting means carried by said frame and on which said carrier is adapted to be moved, said carrier being adapted to be moved along said supporting means by the feed of the sewing machine operating upon the filled bag mounted on the carrier, and means for automatically returning the carrier to normal position for loading after the filled bag has been removed therefrom and for holding the carrier in position for loading the bag.

3. A filled bag closing machine including in combination, a supporting frame, a sewing head mounted thereon having means for feeding the mouth of a filled bag, a carrier, supporting means on the frame on which said carrier is adapted to move, said carrier being adapted to be moved along said supporting means by the feed of the sewing machine operating upon the filled bag mounted on the carrier, and spring means for returning the carrier to normal loading position when the weight of the filled bag is removed from the carrier.

4. A filled bag closing machine including in combination, a supporting frame, a sewing head mounted thereon having means for feeding the mouth of a filled bag, a carrier, supporting means on the frame on which said carrier is adapted to move, said carrier being adapted to be moved along said supporting means by the feed of the sewing machine operating upon the filled bag mounted on the carrier, spring means for returning the carrier to normal loading position when the weight of the filled bag is removed from the carrier, and means for engaging the carrier and holding the same in loading position.

5. A filled bag closing machine including in combination, a supporting frame, a sewing head mounted thereon having means for feeding the mouth of a filled bag, a carrier, supporting means on the frame on which said carrier is adapted to move, said carrier being adapted to be moved along said supporting means by the feed of the sewing machine operating upon the filled bag mounted on the carrier, spring means for returning the carrier to normal loading position when the weight of the filled bag is removed from the carrier, and means for engaging the carrier and holding the same in loading position, said holding means being constructed so that the weight of the filled bag on the carrier releases the holding means and permits the carrier to be moved forward.

6. A filled bag closing machine including in combination a supporting frame, tracks carried thereby, rollers carried by the tracks at fixed spaced distances apart, and a carriage adapted to rest freely on said rollers and move back and forth thereon.

7. A filled bag closing machine including in combination a supporting frame, tracks carried thereby, rollers carried by the tracks at fixed spaced distances apart, a carriage adapted to rest freely on said rollers and move back and forth thereon, and rollers mounted on the carriage adapted to cooperate with the tracks to prevent sidewise movement of the carriage as it moves back and forth on the rollers mounted on the tracks.

8. A filled bag closing machine including in combination, a supporting frame, tracks carried thereby having spaced rollers, and a carriage adapted to rest on said rollers and to be moved back and forth thereon, said carriage including a sheet metal plate having a turned-up portion at the rear edge on which plate the filled bag is adapted to rest.

9. A filled bag closing machine including in combination, a supporting frame, tracks carried thereby having spaced rollers, a carriage adapted to rest on said rollers and to be moved back and forth thereon, said carriage including spaced plates, the lower one of which is adapted to rest on said rollers, rollers located between said plates and adapted to turn about vertical axes, and plates carried by the tracks adapted to be engaged by the rollers between the plates for preventing the carriage from moving sidewise on the tracks.

10. A filled bag closing machine including in combination, a supporting frame, tracks carried thereby having spaced rollers, a carriage adapted to rest on said rollers and to be moved back and forth thereon, said carriage including spaced horizontal plates, the lower one of which rests on said rollers, and spring means located between the plates and adapted to engage a stop on the frame when the carriage is moved forward for returning the carriage to normal loading position when the weight of the bag is removed from the carriage.

11. A filled bag closing machine including in combination, a supporting frame, tracks carried thereby having spaced rollers, a carriage adapted to rest on said rollers and to be moved back and forth thereon, said carriage including spaced horizontal plates, the lower one of which rests on said rollers, spring means located between the plates and adapted to engage a stop on the frame when the carriage is moved forward for returning the carriage to normal loading position when the weight of the bag is removed from the carriage, a roller located in the path of travel of the carriage when said carriage is in loading position, means for yieldingly supporting said roller whereby said roller operates to raise the carriage when free from load, and a stop pin adapted to enter the opening in the carriage to hold said carriage in loading position until the filled bag is placed thereon.

12. A filled bag closing machine including in combination, a supporting frame, tracks carried thereby having spaced rollers, a carriage adapted to rest on said rollers and to be moved back and forth thereon, said carriage including spaced horizontal plates, the lower one of which rests on said rollers, spring means located between the plates and adapted to engage a stop on the frame when the carriage is moved forward for returning the carriage to normal loading position when the weight of the bag is removed from the carriage, a roller located in the path of travel of the carriage when said carriage is in loading position, means for yieldingly supporting said roller whereby said roller operates to raise the carriage when free from load, a stop pin adapted to enter the opening in the carriage to hold said carriage in loading position until the filled bag is placed thereon, and means for adjustably securing said yielding roller to one of the tracks whereby the position of loading may be varied.

13. A filled bag closing machine including in combination, a supporting frame, a carrier, supporting means mounted on the frame on which said carrier is adapted to be moved, an adjustable support mounted on said frame above the carrier, a bracket carried by said adjustable support, a sewing head and a motor for operating the same carried by said bracket, and means for counterbalancing the weight of the bracket, sewing head and motor whereby the same may be adjusted vertically.

14. A filled bag closing machine including in combination, a supporting frame, a carrier, supporting means mounted on the frame on which said carrier is adapted to be moved, an adjustable support mounted on said frame above the carrier, a bracket carried by said adjustable support, a sewing head and a motor for operating the same carried by said bracket, means for counterbalancing the weight of the bracket, sewing head and motor whereby the same may be adjusted vertically, means for locking said sewing head in adjusted position, and a hand lever for raising and lowering the sewing head.

15. A filled bag closing machine including in combination, a supporting frame, a carrier, supporting means mounted on the frame on which said carrier is adapted to be moved, an adjustable support mounted on said frame above the carrier, a bracket carried by said adjustable support, a sewing head and a motor for operating the same carried by said bracket, means for counterbalancing the weight of the bracket, sewing head and motor whereby the same may be adjusted vertically, means for locking said sewing head in adjusted position, a hand lever for raising and lowering the sewing head, a member carried by the frame on which said hand lever is fulcrumed, and means whereby said member may be adjusted vertically.

16. A filled bag closing machine including in combination, a supporting frame, a carrier for the filled bag, supporting means mounted on the frame on which the carrier is adapted to be moved, a bracket adjustable vertically on said frame above the carrier, a supporting plate carried by said bracket, a sewing head mounted on said supporting plate and overhanging the carrier, a motor mounted on said supporting plate for operating the sewing head, and means for adjusting said supporting plate horizontally on said bracket for varying the position of the sewing head relative to the supporting frame and carrier.

17. A filled bag closing machine including in combination, a supporting frame, a carrier for the filled bag, supporting means mounted on the frame on which the carrier is adapted to be moved, a bracket adjustable vertically on said frame above the carrier, a supporting plate carried by said bracket, a sewing head mounted on said supporting plate and overhanging the carrier, a motor mounted on said supporting plate for operating the sewing head, means for adjusting said supporting plate horizontally on said bracket for varying the position of the sewing head relative to the supporting frame and carrier, a treadle, and means operated by the treadle for controlling the motor, said treadle controlled means being constructed so as to permit said plate to be adjusted vertically without interfering with the connection to the motor.

18. A filled bag closing machine including in combination, a supporting frame, a carrier for the filled bag, supporting means mounted on the frame on which the carrier is adapted to be moved, a bracket adjustable vertically on said frame above the carrier, a supporting plate carried by said bracket, a sewing head mounted on said supporting plate and overhanging the carrier, a motor mounted on said supporting plate for operating the sewing head, means for adjusting said supporting plate horizontally on said bracket for varying the position of the sewing head relative to the supporting frame and carrier, a vertical shaft, treadle means for oscillating said vertical shaft, an arm mounted on said vertical shaft, means whereby said arm is permitted to move endwise of said shaft, but is held so as to oscillate therewith, devices operated by said arm for controlling the motor, and means carried by the plate for supporting the upper end of the vertical shaft and for moving said arm lengthwise of the shaft when said plate is adjusted.

19. A filled bag closing machine including in combination, a supporting frame, a carrier for the filled bag, supporting means mounted on the frame on which the carrier is adapted to be moved, a bracket adjustable vertically on said frame above the carrier, a supporting plate carried by said bracket, a sewing head mounted on said supporting plate and overhanging the carrier, a motor mounted on said supporting plate for operating the sewing head, means for adjusting said supporting plate horizontally on said bracket for varying the position of the sewing head relative to the supporting frame and carrier, a vertical shaft, treadle means for oscillating said vertical shaft, an arm mounted on said vertical shaft, means whereby said arm is permitted to move endwise of said shaft, but is held so as to oscillate therewith, devices operated by said arm for controlling the motor, means carried by the plate for supporting the upper end of the vertical shaft and for moving said arm lengthwise of the shaft when said plate is adjusted, and means for maintaining the support for the upper end of said shaft at a given distance from the supporting frame when said plate is adjusted for shifting the sewing machine toward and from the frame.

20. A filled bag closing machine including in combination, a supporting frame, a carrier for the filled bag, supporting means mounted on the frame on which the carrier is adapted to be moved, a bracket adjustable vertically on said frame above the carrier, a supporting plate carried by said bracket, a sewing head mounted on said supporting plate and overhanging the carrier, a motor mounted on said supporting plate for operating the sewing head, means for adjusting said supporting plate horizontally on said bracket for varying the position of the sewing head relative to the supporting frame and carrier, a vertical shaft, treadle means for oscillating said vertical shaft, an arm mounted on said vertical shaft, means whereby said arm is permitted to move endwise of said shaft, but is held so as to oscillate therewith, devices operated by said arm for controlling the motor, means carried by the plate for supporting the upper end of the vertical shaft and for moving said arm lengthwise of the shaft when said plate is adjusted, said devices for controlling the motor including telescopic parts which permit the motor to be adjusted with the sewing head without varying the position of the upper end of the vertical shaft.

21. A filled bag closing machine including in combination, a supporting frame, a carrier for the filled bag, supporting means mounted on the frame on which the carrier is adapted to be moved, a bracket adjustable vertically on said frame above the carrier, a supporting plate carried by said bracket, a sewing head mounted on said supporting plate and overhanging the carrier, a motor mounted on said supporting plate for operating the sewing head, means for adjusting said supporting plate horizontally on said bracket for varying the position of the sewing head relative to the supporting frame and carrier, a vertical shaft, treadle means for oscillating said vertical shaft, an arm mounted on said vertical shaft, means whereby said arm is permitted to move endwise of said shaft, but is held so as to oscillate therewith, devices operated by said arm for controlling the motor, means carried by the plate for supporting the upper end of the vertical shaft and for moving said arm lengthwise of the shaft when said plate is adjusted, and means for maintaining the support for the upper end of said shaft at a given distance from the supporting frame when said plate is adjusted for shifting the sewing machine toward and from the frame, said devices for controlling the motor including telescoping parts which permit the motor to be adjusted toward and from the frame without shifting the end of the vertical shaft.

22. A filled bag closing machine including in combination, a supporting frame, a sewing head mounted on said frame, a motor carried by the frame for operating the sewing head, said motor being adjustable toward and from the frame, a vertical shaft, a treadle for oscillating the vertical shaft, devices mounted on the vertical shaft for controlling the motor, said devices including telescoping parts whereby the motor may be adjusted without shifting the position of said vertical shaft.

23. A filled bag closing machine including in combination, a supporting frame, a bracket mounted on said supporting frame for vertical adjustment, a sewing head mounted on said bracket, a motor carried by said bracket for operating the sewing head, a vertical shaft, a treadle controlled means for oscillating said vertical shaft, an arm freely slidable lengthwise of said vertical shaft but held to oscillate therewith, devices operated by said arm for controlling the motor, and means carried by the support for the motor for shifting said arm endwise of the vertical shaft when the motor is raised and lowered.

24. A filled bag closing machine including in combination, a supporting frame, a bracket mounted on said supporting frame for vertical adjustment, a sewing head mounted on said bracket, a motor carried by said bracket for operating the sewing head, a vertical shaft, a treadle controlled means for oscillating said vertical shaft, an arm freely slidable lengthwise of said vertical shaft but held to oscillate therewith, devices operated by said arm for controlling the motor, means carried by the support for the motor for shifting said arm endwise of the vertical shaft when the motor is raised and lowered, belt wheels carried by the motor and sewing head, respectively, whereby the rotations of the motor are imparted to the sewing head, means whereby the motor may be shifted for tightening the belt, said controlling devices for the motor including telescoping parts which permit the motor to be adjusted without varying the position of the vertical shaft.

25. A filled bag closing machine including in combination, a supporting frame, a sewing head, a supporting bracket for said sewing head movable vertically on said frame, a motor mounted on said bracket, a vertical shaft carried by said frame, said shaft being rectangular in cross section, an arm having a sleeve with a rectangular opening adapted to fit said shaft whereby the arm may move freely endwise of the shaft but will oscillate therewith, a yoke bracket carried by the bracket supporting the motor for supporting the upper end of said shaft against lateral movement and for supporting and moving said arm endwise of the shaft, devices operated by said arm for controlling the motor, and means for oscillating said shaft.

26. A filled bag closing machine including in combination, a supporting frame, a sewing head, a supporting bracket for said sewing head movable vertically on said frame, a motor mounted on said bracket, a vertical shaft carried by said frame, said shaft being rectangular in cross section, an arm having a sleeve with a rectangular opening adapted to fit said shaft whereby the arm may move freely endwise of the shaft but will oscillate therewith, a yoke bracket carried by the bracket supporting the motor for supporting the upper end of said shaft against lateral movement and for supporting and moving said arm endwise of the shaft, devices operated by said arm for controlling the motor, a horizontal shaft having a treadle accessible to the operator, an upwardly projecting arm carried by the horizontal shaft, a horizontally projecting arm at the lower end of the vertical shaft, a link connecting the same to the arm on the horizontal shaft, and a spring for normally raising the treadle and shifting the parts controlled thereby so that the motor is ineffective to operate the sewing mechanism.

27. A filled bag closing machine including in combination, a supporting base formed of angle irons, a framework supported by said base and rising therefrom, said framework including a pipe section and fittings for supporting the same, a sleeve slidable upon the pipe section, a sewing head supported by said sleeve, a second sleeve beneath said first named sleeve slidable upon said pipe section, and a support for the filled bag located beneath the sewing head and carried by said second sleeve.

28. A filled bag closing machine including a supporting base formed of angle irons, a framework carried by said base and rising therefrom and including parallel pipe sections, fittings for connecting said sections to the base and to each other, a cross head slidable upon said pipe sections, a sewing head mounted on said cross head, a second cross head slidable upon said pipe sections, and a filled bag support carried by said second cross head and located beneath the sewing head.

29. A filled bag closing machine including a supporting base formed of angle irons, a framework carried by said base and rising therefrom and including parallel pipe sections, fittings for connecting said sections to the base and to each other, a cross head slidable upon said pipe sections, a sewing head mounted on said cross head, a second cross head slidable upon said pipe sections, a filled bag support carried by said second cross head and located beneath the sewing head, and means for counterbalancing the weight of the upper cross head and the parts carried thereby.

30. A filled bag closing machine including a supporting base formed of angle irons, a framework carried by said base and rising therefrom and including parallel pipe sections, fittings for connecting said sections to the base and to each other, a cross head slidable upon said pipe sections, a sewing head mounted on said cross head, a second cross head slidable upon said pipe sections, a filled bag support carried by said second cross head and located beneath the sewing head, means for counterbalancing the weight of the upper cross head and the parts carried thereby, said means including a weight and flexible devices running over pulleys and connected to said cross head, said weight being housed in one of the pipe sections forming a part of the supporting frame.

31. A filled bag closing machine including a supporting base, a framework rising therefrom constructed of standard commercial angle irons, pipe sections and fittings therefor, a cross-head slidable vertically on the frame, a sewing head mounted on said cross-head, a second cross-head slidable vertically on said frame, a support carried by said second cross-head and located beneath the sewing head for the filled bag, and means for counterbalancing the weight of the cross-head and support carried thereby for the filled bag, said means including a weight, and a flexible member running over pulleys and connecting the weight to the lower cross-head, said weight being housed in one of the pipes forming a part of the frame structure.

32. A filled bag closing machine including a supporting base, a framework rising therefrom constructed of standard commercial angle irons, pipe sections and fittings therefor, a cross-head slidable vertically on the frame, a sewing head mounted on said cross-head, a second cross-head slidable vertically on said frame, a support carried by said second cross-head and located beneath the sewing head for the filled bag, means for counterbalancing the weight of the upper cross-head and the parts carried thereby, and means for counterbalancing the weight of the cross head and support carried thereby for the filled bag, said means including a weight, and a flexible member running over pulleys and connecting the weight to the lower cross head, said weight being housed in one of the pipes forming a part of the frame structure.

33. A filled bag closing machine including a supporting base, two tubular columns rising therefrom, means for rigidly connecting said columns, upper and lower cross-heads slidable vertically on said columns, a sewing head carried by the upper cross-head, and a filled bag support carried by the lower cross-head.

34. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing the weight of the upper cross-head and parts carried thereby, a hand lever for raising and lowering the upper cross-head, and means for securing the upper cross-head in adjusted position.

35. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing the weight of the upper cross-head and parts carried thereby, a hand lever for raising and lowering the upper cross head, means for securing the upper cross-head in adjusted position, and means for counterbalancing the weight of the lower cross-head and parts carried thereby, and means for holding said lower cross-head in adjusted position.

36. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing the weight of the upper cross head and parts carried thereby including a weight, pulleys and a flexible means running over said pulleys, said pulleys being arranged so that the weight travels a greater distance than the cross-head.

37. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing the weight of the upper cross-head and parts carried thereby including a weight, pulleys and a flexible means running over said pulleys, said pulleys being arranged so that the weight travels a greater distance than the cross-head, said weight being housed and slidable within one of said columns.

38. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing said upper cross-head including a weight running in one of said columns, and means for counterbalancing said lower cross-head including a weight running in the other column.

39. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing said upper cross-head including a weight running in one of said columns, and means for counterbalancing said lower cross-head including a weight running in the other column, said counterbalancing devices for the upper and lower cross-heads including pulleys arranged so that the weights travel a greater distance than the cross-heads.

40. A filled bag closing machine including a supporting base, two tubular columns rising therefrom, means for rigidly connecting said columns, upper and lower cross-heads slidable vertically on said columns, a sewing head carried by the upper cross-head, a filled bag support carried by the lower cross-head, means for counterbalancing the weight of said lower cross head including a weight running in one of said columns, and pulleys arranged so that said weight travels a greater distance than the lower cross-head.

41. A filled bag closing machine including in combination, two vertical tubular columns, a pipe and couplings for connecting the upper ends of said columns, a sleeve on each column, means connecting said sleeves and forming a sliding cross-head, a bracket supported by said cross-head, a sewing head mounted on said bracket, sleeves slidable on said columns beneath the upper cross-head, means connecting said sleeves and forming a lower cross-head, bracket arms carried by said lower cross-head, a filled bag carrier mounted on said brackets carried by the lower cross-head, means whereby said upper cross-head may be held in adjusted positions, and means whereby said lower cross-head may be held in adjusted positions.

42. A filled bag closing machine including in combination, two vertical tubular columns, a pipe and couplings for connecting the upper ends of said columns, a sleeve on each column, means connecting said sleeves and forming a sliding cross-head; a bracket supported by said cross-head, a sewing head mounted on said bracket, sleeves slidable on said columns beneath the upper cross-head, means connecting said sleeves and forming a lower cross-head, bracket arms carried by said lower cross-head, a filled bag carrier mounted on said brackets carried by the lower cross-head, means whereby said upper cross-head may be held in adjusted positions, means whereby said lower cross-head may be held in adjusted positions, a counterbalance for the upper cross-head, and a counterbalance for the lower cross-head.

43. A filled bag closing machine including in combination, two vertical tubular columns, a pipe and couplings for connecting the upper ends of said columns, a sleeve on each column, means connecting said sleeves and forming a sliding cross-head, a bracket supported by said cross-head, a sewing head mounted on said bracket, sleeves slidable on said columns beneath the upper cross-head, means connecting said sleeves and forming a lower cross-head, bracket arms carried by said lower cross-head, a filled bag carrier mounted on said brackets carried by the lower cross-head, means whereby said upper cross-head may be held in adjusted positions, means whereby said lower cross-head may be held in adjusted positions, a counterbalance for the upper cross-head, a counter-balance for the lower cross-head, a hand lever, a collar shiftable on one of said columns to which said lever is fulcrumed, and a link connecting said lever with the upper cross-head whereby the cross-head may be raised and lowered when released from the column.

44. A filled bag closing machine including a supporting base, spaced vertical tubular columns, a cross pipe and couplings for connecting the upper ends of said columns, an upper cross-head slidable upon said columns, a sewing head carried thereby, sleeves mounted on said columns beneath the upper cross-head, means connecting said sleeves and forming a lower cross-head, means whereby said lower cross-head may be adjusted and held in adjusted positions, a carrier for the filled bag, brackets carried by said lower cross-head, and parallel tracks mounted on said brackets on which the carrier is adapted to move back and forth.

45. A filled bag closing machine including a supporting base, spaced vertical tubular columns, a cross pipe and couplings for connecting the upper ends of said columns, an upper cross-head slidable upon said columns, a sewing head carried thereby, sleeves mounted on said columns beneath the upper cross-head, means connecting said sleeves and forming a lower cross-head, means whereby said lower cross-head may be adjusted and held in adjusted positions, a carrier for the filled bag brackets carried by said lower cross-head, and parallel tracks mounted on said brackets on which the carrier is adapted to move back and forth, said tracks having a series of rollers which support the carrier.

46. A filled bag closing machine including a supporting base, spaced vertical tubular columns, a cross pipe and couplings for connecting the upper ends of said columns, an upper cross-head slidable upon said columns, a sewing head carried thereby, sleeves mounted on said columns beneath the upper cross-head, means connecting said sleeves and forming a lower cross-head, means whereby said lower cross-head may be adjusted and held in adjusted positions, a carrier for the filled bag, brackets carried by said lower cross-head, parallel tracks mounted on said brackets on which the carrier is adapted to move back and forth, cross braces, and connecting rods for rigidly connecting said tracks.

47. A filled bag closing machine including a supporting base, spaced vertical tubular columns, a cross pipe and couplings for connecting the upper ends of said columns, an upper cross-head slidable upon said columns, a sewing head carried thereby, sleeves mounted on said columns beneath the upper cross-head, means connecting said sleeves and forming a lower cross-head, means whereby said lower cross-head may be adjusted and held in adjusted positions, a carrier for the filled bag, brackets carried by said lower cross-head, parallel tracks mounted on said brackets on which the carrier is adapted to move back and forth, cross braces, and connecting rods for rigidly connecting said tracks, said supporting base including a central member and cross members at the ends thereof disposed so that said brackets supporting the tracks may move downwardly between said cross members to a point in contact with the floor.

48. A filled bag closing machine including a supporting base, spaced vertical tubular columns, a cross pipe and couplings for connecting the upper ends of said columns, an upper cross-head slidable upon said columns, a sewing head carried thereby, sleeves mounted on said columns beneath the upper cross-head, means connecting said sleeves and forming a lower cross-head, means whereby said lower cross-head may be adjusted and held in adjusted positions, brackets carried by said lower cross-head, parallel tracks mounted on said brackets on which a carrier is adapted to move back and forth, said supporting base including a central member and cross members, rollers mounted on one of said cross members at the ends thereof, a single roller carried by the other cross member, and leveling and supporting bolts at the ends of said last-named cross member.

49. A filled bag closing machine including in combination, an H-shaped supporting base comprising a central member and cross members attached at each end thereof, a roller at each end of one of said cross members, a roller centrally of the other cross member and carried thereby so as to turn freely in any direction, leveling and retaining bolts at the ends of said last-named cross member, a supporting frame rising vertically from said central member, a cross-head slidable vertically on said frame, a sewing head and motor mounted on said cross-head, a second cross-head slidable vertically on said frame, a support mounted on said last-named cross-head, and a carrier on said support for the filled bag.

50. A filled bag closing machine including in combination, an H-shaped base comprising a central member and a cross member at each end thereof, spaced tubular columns carried by said central member, means for rigidly connecting said columns at their upper ends, means for connecting said columns intermediate their ends, braces connecting said columns to the end members, a sewing head mounted on said columns, and a filled bag support mounted on said columns and located beneath the sewing head.

51. A filled bag closing machine including in combination, a supporting frame, a sewing head mounted thereon having means for feeding the mouth of the filled bag, means for horizontally adjusting said sewing head across the direction of travel of the bag, a carrier supporting means carried by said frame and on which said carrier is adapted to be moved, said carrier being adapted to be moved along said supporting means by the feed of the sewing machine operating on the filled bag mounted on the carrier.

52. A filled bag closing machine including a supporting base, a framework rising therefrom, a sewing head adapted to slide vertically on said framework, sleeves vertically adjustable on said framework, spaced tracks connecting said sleeves, rollers attached to the side of said tracks, a carriage for the filled bag mounted on said rollers and movable back and forth thereon, and means whereby said tracks may be raised and lowered.

53. A filled bag closing machine including a supporting base, framework rising therefrom, a sewing head adapted to slide vertically on said framework, sleeves vertically adjustable on said framework, spaced tracks connecting said sleeves, rollers attached to the side of said tracks a carriage for the filled bag mounted on said rollers and movable back and forth thereon, rollers attached to the carriage horizontally rotatable and adapted to roll against the side of said tracks to take side thrust, and means whereby said tracks may be raised and lowered.

54. A filled bag closing machine including a supporting base, spaced vertical columns carried thereby, a sewing head vertically adjustable on said columns, tracks vertically adjustable upon said columns beneath the sewing head, a carrier for a filled bag mounted on said tracks, a support located between the sewing head and the tracks for engaging the bag intermediate its ends and along which said bag slides, and means whereby said last-named support may be vertically adjusted.

In testimony whereof we affix our signatures.

CHARLES S. THOMPSON.
WILLIAM B. LONG.